United States Patent [19]

Menon et al.

[11] Patent Number: 4,992,170
[45] Date of Patent: Feb. 12, 1991

[54] REVERSE OSMOSIS FILTER CARTRIDGE ASSEMBLY

[75] Inventors: Krishna S. Menon, Liverpool; Stephen J. Laird, Baldwinsville, both of N.Y.

[73] Assignee: Eastman Kodak Company, Rochester, N.Y.

[21] Appl. No.: 504,446

[22] Filed: Apr. 3, 1990

[51] Int. Cl.$^5$ .............................................. B01D 6/08
[52] U.S. Cl. ......................... 210/321.78; 210/321.87; 210/500.23; 210/435
[58] Field of Search ........... 210/321.6, 327.72, 321.74, 210/321.83, 321.78, 321.87, 460, 348, 435, 436–440, 443, 446–451, 453, 500.23

[56] References Cited

U.S. PATENT DOCUMENTS 4,107,046 8/1978 Corder ................................. 210/460

Primary Examiner—Frank Sever
Attorney, Agent, or Firm—Martin Lukacher

[57] ABSTRACT

A three element reverse osmosis filter cartridge assembly has a pre-filter section for solid particles, a reverse osmosis membrane filter section which produces product water and waste water from feed water circulated thereto via the pre-filter section, and a post-filter section for filtering the product water. These sections are disposed in coaxial, concentric relationship. The pre-filter section forms a replaceable outside sheath which is slideable onto and off the membrane section. The post-filter section is a tubular body containing carbon or other particles which is removably disposed in a central opening inside the membrane section. The membrane section has a support ring defining one end of the cartridge assembly which is disposed in sealing relationship with a ring which holds filter media layers of the pre-filter section. The pre-filter section has another ring at the end thereof opposite to said first ring and defines the opposite end of said pre-filter section. The cartridge assembly is replaceably disposed in a tubular housing having an end plate at one end thereof and a removable end cap at the opposite end thereof. The end plate has openings or ports for communicating feed water into said pre-filter section and for the out feed of waste water and product water from said membrane section and post-filter section, respectively. The cartridge assembly may be removed as an integral unit from the tubular housing when the end cap is removed, and the three sections thereof are each replaceable independently so that either an entire cartridge unit or the cartridge unit with a fresh pre-filter section, a fresh post-filter section or a fresh membrane section can be replaced in the housing.

10 Claims, 4 Drawing Sheets

REVERSE OSMOSIS FILTER CARTRIDGE ASSEMBLY

DESCRIPTION

The present invention relates to a filter cartridge assembly for producing purified water from feed water by reverse osmosis, and particularly to an improved three element filter cartridge assembly having a reverse osmosis filter section, a pre filter section for providing feed water to said reverse osmosis section and a post-filter section for product water from said reverse osmosis section.

The present invention is especially suitable for providing an improved TRIPAK filter cartridge assembly. TRIPAK is a trade mark of Fastek, a Kodak Company of Liverpool, New York, U.S.A. Reference may be had to U.S. patent application Ser. No. 208,817, filed June 16, 1988 in the name of B.A. Brown et al, and assigned to the same assignee as this application which describes a TRIPAK filter cartridge assembly. The invention will be found useful in other reverse osmosis apparatus wherever a replaceable pre-filter unit is necessary or desirable.

The TRIPAK reverse osmosis filter, which is available from Fastek and which is described in the above-identified U.S. patent application, is a three in one assembly contained in a tubular housing. In that filter, a reverse osmosis membrane filter is spirally wound on a carrier tube mounted on a spoke wheel. A pre-filter is wound around the outside of the membrane tube and is permanently attached thereto. The pre-filter is subject to clogging due to particles of mud or dirt which are trapped therein and has a definite life while the membrane filter has an indefinite life and need be replaced only if physically damaged either mechanically or chemically. The TRIPAK filter has a cylindrical container with a bed of carbon or other particles therein which is disposed within the mounting tube. Product water flows through openings in the mounting tube and then around an annular space between the mounting tube and the post-filter container axially through the container so as to remove dissolved gases and ions from the product water. The post-filter has a definite life and is removable. The pre-filter is not removable. When it clogs (which occurs even after reverse flow cleanup procedures are used, the entire membrane and pre-filter must be replaced. The membrane section is the most expensive part of the reverse osmosis filter unit. It is therefore desirable to enable the pre-filter unit to be replaceable independently of the membrane filter. Pre-filter units are themselves wound from layers of filter media and net or other flow-through media which are flexible and frangible. Accordingly, pre-filters have been wound around membrane filters so as to provide the necessary large pre-filtering area while allowing the pre-filter to be supported and maintained in position in use while water is fed under pressure therethrough.

Accordingly, it is the principal object of the present invention to provide an improved reverse osmosis cartridge assembly which has a plurality of filter sections, one of which is a pre-filter section and the other a reverse osmosis membrane filter section, which sections may be removably assembled in a housing so that each section may be replaceable independently or the entire cartridge assembly may be replaceable. The housing which, with the assembly provides, a reverse osmosis filter unit.

It is a further object of the invention to provide an improved reverse osmosis cartridge assembly for use in a tubular housing having concentric coaxial post-filter, reverse osmosis membrane body and pre-filter sections respectively disposed as the central core, a cylindrical tubular body around the central core and as a tubular sheath around the tubular body, the post-filter and the pre-filter section being axially moveable in opposite directions to separate them from the membrane body when replacement thereof in the assembly is necessary or desirable.

Briefly described, a reverse osmosis filter cartridge assembly embodying the invention is adapted to be contained in a tubular housing to provide a reverse osmosis filter unit. The cartridge has an annular reverse osmosis membrane section, a cylindrical post-filter section and an annular pre-filter section, which sections are disposed in coaxial relationship and may be received into or removed from the tubular housing as a unitary assembly. The cartridge has a mechanism for permitting the sections to be separable from the housing as a unitary structure, as well as for permitting the pre-filter and post-filter and membrane sections to be separated independently. The mechanism comprises a carrier ring having a central opening. A reverse osmosis membrane body having an outer peripheral surface is supported on the ring at one end thereof; the carrier ring thereby providing a support ring for the membrane body. In other words, the support ring and membrane body comprise the membrane section as a unitary structure. The post-filter is received in the opening in the support ring within the membrane section and may independently be removed and replaced when the assembly is removed from the tubular housing. The pre-filter section defines a sheath movably disposed around the outer peripheral surface of the membrane section in juxtaposition and in contact therewith so that when assembled, it is supported on the membrane section. The pre-filter section preferably has end rings, one of which is disposed in sealing relationship with the support ring when the pre-filter section is assembled with the other sections to provide the cartridge assembly. These rings are disposed at opposite ends of the pre-filter assembly which are also located at opposite ends of the cartridge assembly.

The foregoing and other objects, features and advantages of the invention, as well as a presently preferred embodiment thereof will become more apparent from the reading of the following description in connection with the accompanying drawings in which.

Reference may be had to the above-identified U.S. patent application for detailed information respecting the design of membrane filter systems and the materials used therein and also as to the design of the post and pre-filters of the TRIPAK reverse osmosis filter unit. In addition, the following U.S. patents to Brown, et al describe the composition and manufacturer of reverse osmosis membrane filters (permeators). U.S. Pat. Nos. 3,789,993, 3,792,135 and 3,824,239. Further information respecting membrane permeators and their compositions may also be found in the following U.S. Pat. Nos. 4,267,182, 4,026,977, 3,855,122, 3,567,810, 4,203,848 and 4,277,344. Bray U.S. Pat. No. 3,507,796 and 3,542,199 show combinations of pre-filters, membrane permeators and post-filters in reverse osmosis water purification systems. Accordingly, this description is directed principally to the mechanism for providing a filter cartridge assembly whereby a pre-filter may be provided as a replaceable part of the reverse osmosis filter cartridge assembly.

Figure 1:
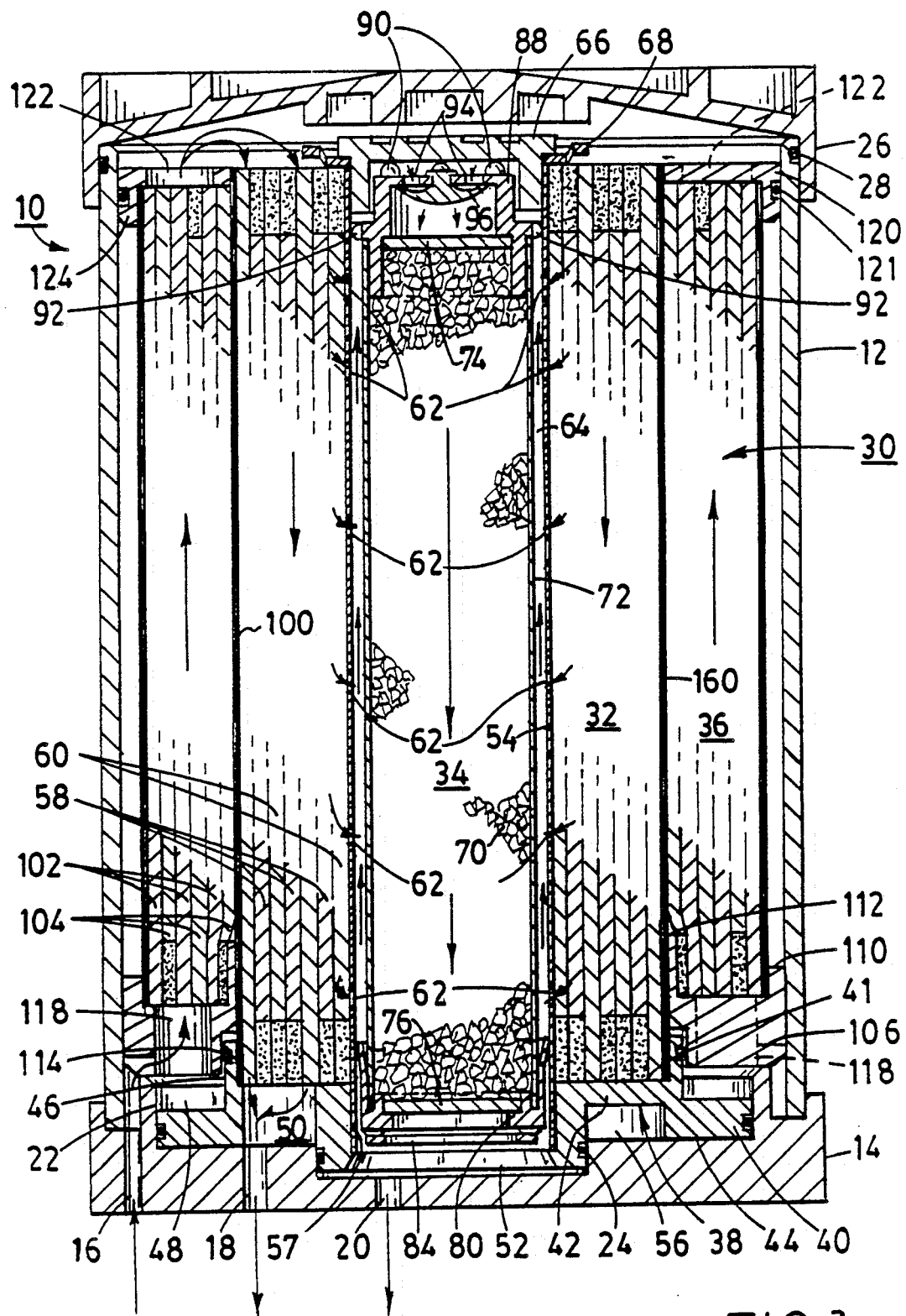
FIG. 1 is a transverse section along a longitudinal axis of a reverse osmosis filter unit containing a filter cartridge assembly embodying the invention.
Figure 2:
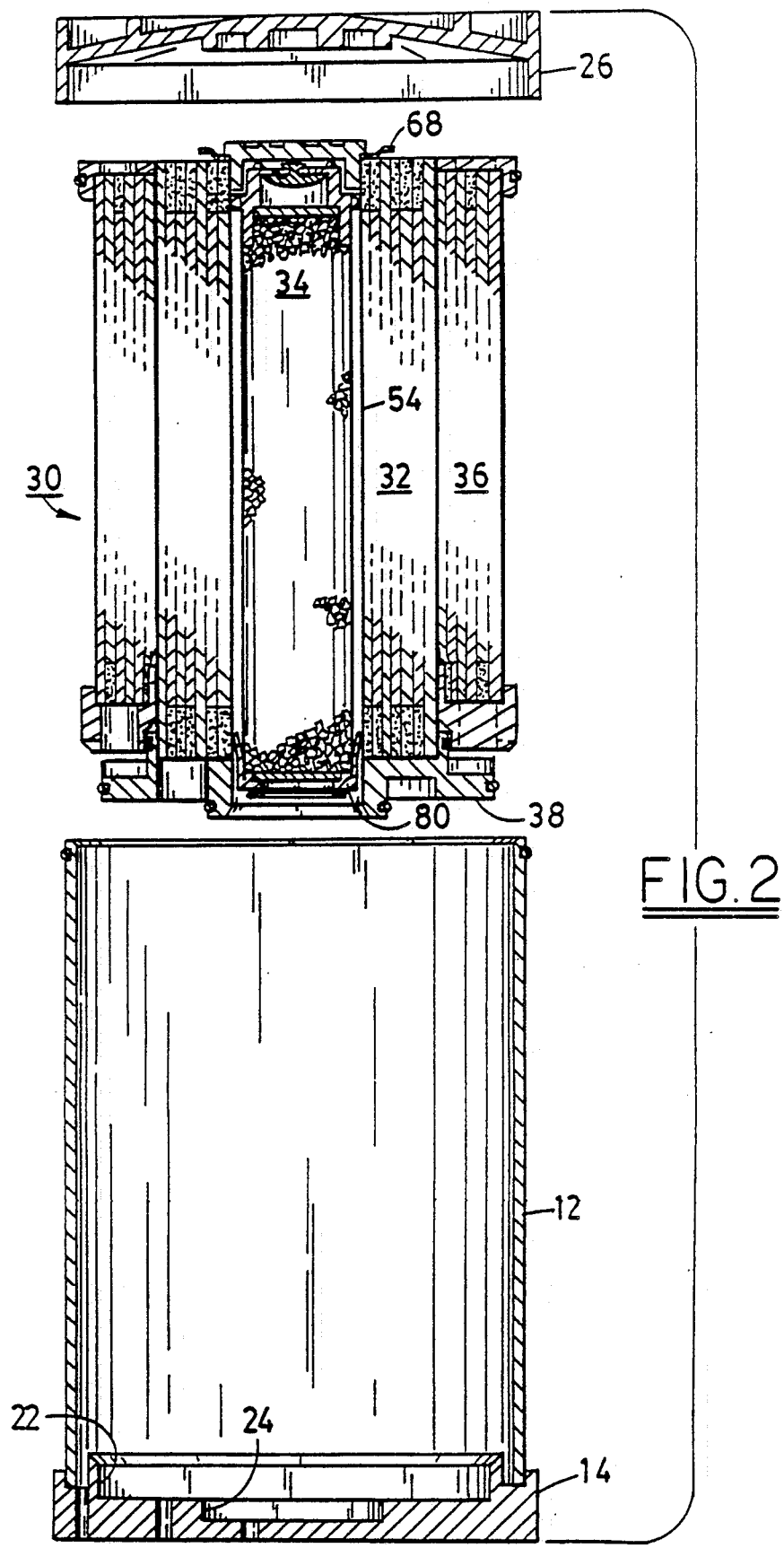
FIG. 2 is an exploded view showing the assembly removed in its entirety from the tubular housing of the filter unit.

Referring first to FIG. 1, there is shown a reverse osmosis filter unit 10 having a cylindrical outer housing tube 12 mounted on and extending axially from an end plate 14. The plate has a feed water inlet opening or port 16, a waste water outlet or port 18 and a product water outlet or port 20. The end plate 14 may carry suitable piping and valves for controlling the reverse osmosis system embodying the unit 10. The end plate has steps which define sealing surfaces 22 and 24. At the opposite end of the housing tube 12 is a removable end cap 26. This end cap is sealed to the housing tube 12 suitably by an O-ring seal 28. The end cap may be mounted on the housing 12 by means such as tie rods which extend to the end plate 14, threaded engagement, bayonet fitting, etc. An air cap fitting (not shown) may be provided on the end cap.

Within the housing 12 is a removable filter cartridge assembly 30. This assembly has a membrane filter section 32, a post-filter section 34 at the core thereof and a pre-filter section 36 on the outside of the membrane section. All of these sections are coaxially and concentrically disposed in the housing tube 12.

The reverse osmosis filter section 32 is mounted on a support ring 38 having a rim 40, an annular section 42 defined by spokes or openings which extend there through between an inside surface 41 and an outside surface 44 of the ring 38. The ring 38 also has an annular flange 46 around the spoke portion 42 thereof. The ring 38 may be made of a suitable water impermeable material such as a plastic like polyester, NORYL, ABS, PVC, polyethylene or polypropylene. The support ring 38 has O-ring seals which bear against the end plate surfaces 22 and 24 and define an annular in feed water chamber 48, an annular waste water out feed chamber 50 and a product water out feed chamber 52 which respectively communicate with the in feed port 16, the waste water port 18, and the product water port 20.

A plurality of layers providing an annular reverse osmosis membrane permeator of the Section 32 are spirally wound on a mounting tube 54, also of water impermeable material, such as the plastics mentioned above. The mounting tube 54 is attached, as by ultrasonic or spin welding or adhesive at the lower end thereof to the periphery of a central opening or hole 57 in the support ring 38. Briefly, the layers of the membrane filter include spacer layers around a reverse osmosis membrane layer and porous fabric layers. The reverse osmosis membrane layer is shown at 58. The fabric layer shown at 60 axially transports pre-filtered water over the reverse osmosis membrane layers to direct waste water into the waste water outlet chamber 56. Product water or permeate passes through the reverse osmosis layers 58 in an inwardly spiraling path and is carried through openings 62 in the mounting tube 54.

A top end cap 66 is welded to the top of the tube 54 and holds a pull ring 68, by means of which the entire cartridge assembly 30 including all three sections 32, 34 and 36 may be removed from the housing tube 12 when the cover 26 is removed.

The post filter 34 includes a bed of particulate or granular filter material 70 within a support tube 72. There are porous disks 74 and 76 at each end of the tube holding the filter bed in place. The filter bed is preferably granulated activated carbon or charcoal. Other materials may be used such as ground granular brass, ion-exchange resins or mixtures of granulated activated carbon or charcoal with either ground granular brass or ion exchange resins. A lip seal cap 80, which may alternatively be an O-ring seal, closes the bottom of the pre-filter tube 72. A pull ring or handle 84 is connected to the cap 80 at the bottom thereof so as to enable the post-filter to be removed from within the central opening within the mounting tube 54. The top of the post-filter has a cap 88 with spacing protuberances 90 extending from the top thereof which sets the position of the post-filter in the tube 54. There are also radial protuberances 92 which define an annular passage 64 for product water which enters the passage 64 via holes 62 in the tube 54 and through flow passage holes 94 in the top cap 88 via an umbrella valve 96 which opens when the unit 10 is pressurized and flow of product water occurs. The product water then flows axially through the filter particles 70 and out into the product water outlet chamber 52 from which the product water is extracted via the port 20.

The outer periphery of the membrane filter 32 is wrapped with a layer 100 of water impermeable material which provides both a barrier layer to prevent flow radially outward of the membrane filter and to direct it radially downward as shown in the drawing, and also to provide a low coefficient surface to facilitate movement of the pre-filter section 30 for removal or replacement thereof.

The pre-filter section 36 defines a sheath. It is preferably made of a plurality of layers of unwoven cloth such as polypropylene as shown at 102 separated by open weave or net material layers shown at 104. The woven cloth layers may have edges at the top and bottom which are offset attached to define a saw tooth like cross-section. The outer peripheral surface of the pre-filter may be wrapped with plastic material (such as tape) to form a water impervious barrier layer.

A ring 106 having an O-ring seal 114 is disposed at the lower end of the pre-filter section 30. This ring has inner and outer rims or flanges 110 and 112. The inner rim has an O-ring seal 114 which bears against the annular flange 46 and seals the in feed water chamber 48. The layers 102 and 104 are carried within the flanges 110 and 112 which supports them against separation. The ring 106 also has a plurality of axial holes 118 which allow the passage of feed water from the feed water inlet chamber 48 axially through the filter media via the spacer or net layers thereof and out through an upper end ring 120 via holes 122 spaced thereabout. The ring 120 is a seal ring having an O-ring seal 121 on a rim 124 thereof which also provides a base against which the layers 102 and 104 of the pre-filter bear. The outer rims 110 and 124 of the rings 106 and 120, respectively, also separate the pre-filter layers 102 and 104 from the wall of the tubular housing 12 so that the filter assembly 30 can be easily inserted or withdrawn from the housing 12.

It will also be apparent that the flange 46 provides a stop or index for the pre-filter section when it is placed as a sheet about the membrane section 32. When the entire assembly is placed in the housing 12, the top of the flange, which provides the surface 22, acts as a stop and the pre-filter section 30 may shift upwardly somewhat to the position where the ring 120 has its upper surface substantially in alignment with the top surface of the membrane section 32, as shown.

The cover cap 26 defines a space affording a passage for pre-filtered water into the top of the membrane section 32.

It will be apparent from FI. 2 that the entire filter cartridge assembly 30 can be removed from the housing tube 12 by pulling it out with the pull ring 68. Force from the pull ring is applied via the mounting tube 54 to the support ring 38. Any downward movement of the pre-filter section 36 is stopped by the support ring 38. The post-filter 34 is held inside the mounting tube 54 due to the friction provided by the seal at the end cap 80.

Figure 3:
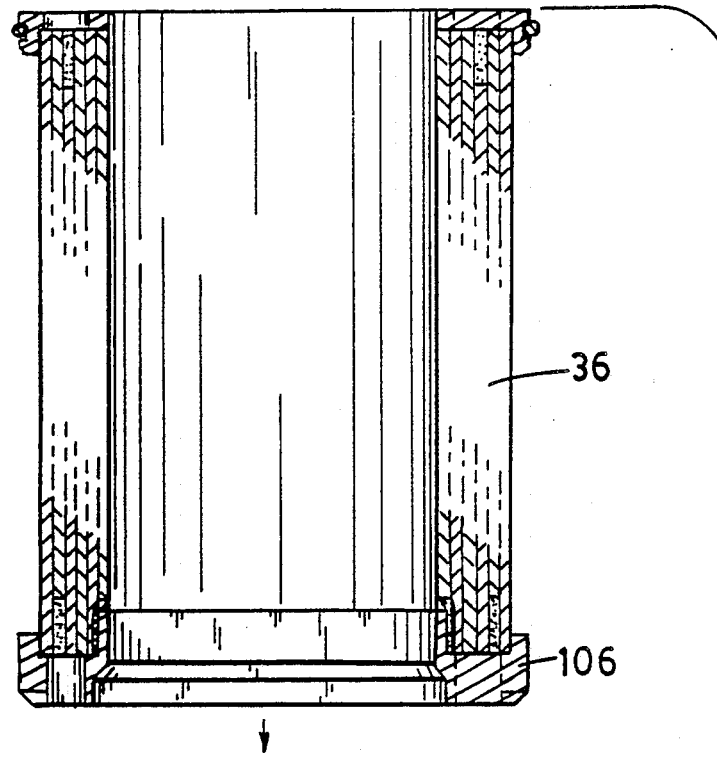
FIG. 3 is an exploded view showing the pre-filter section removed from the membrane and post-filter section of the cartridge assembly.
Figure 3:
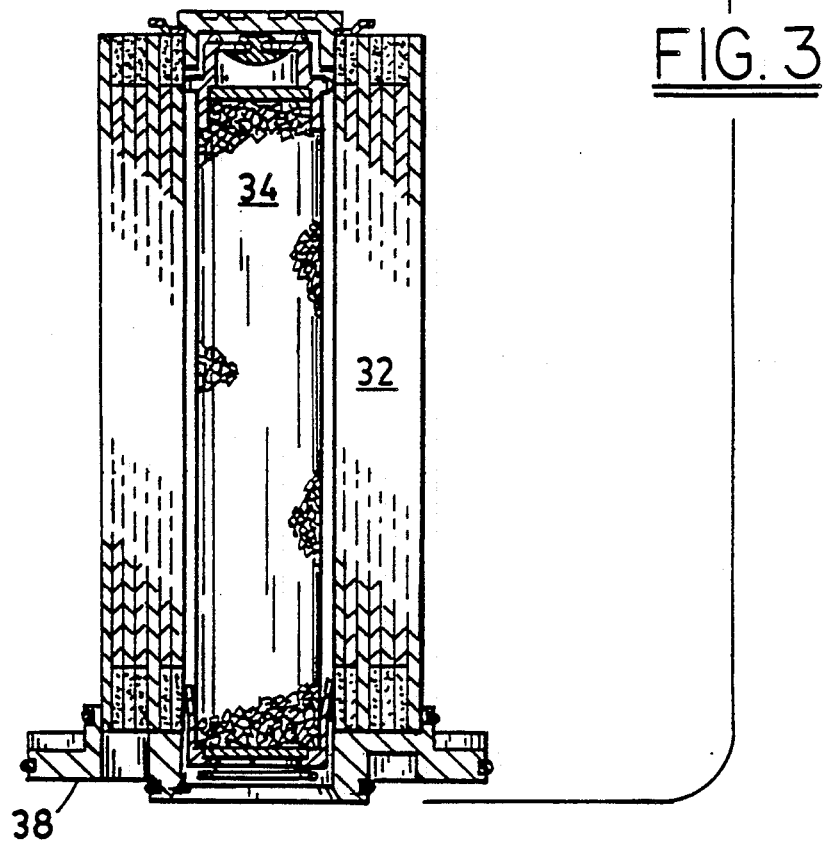

FIG. 3 illustrates the pre-filter 36 removed from the membrane filter 32 and post-filter 34 sections, which remain assembled. The support ring 38 is held, either manually or with a suitable extraction tool, while the pre-filter is held at the ring 106, then the sections 32 and 34 are pulled downwardly with respect to the section 36.

Figure 4:
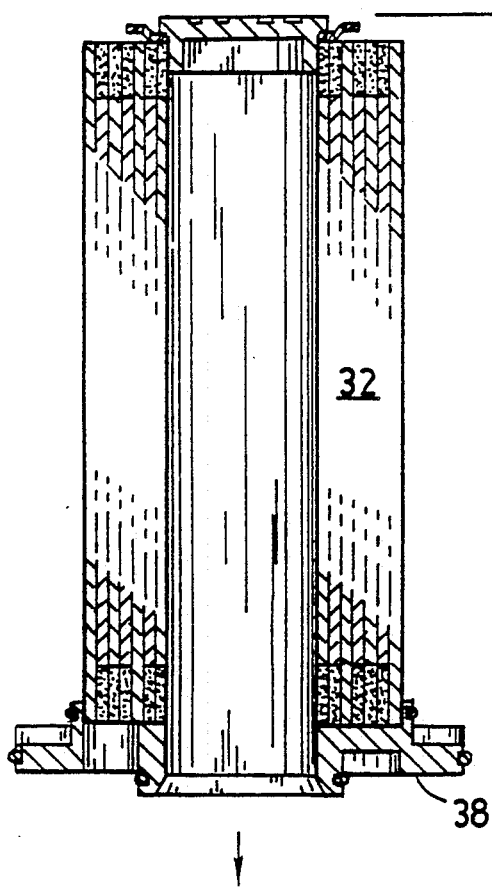
FIG. 4 is an exploded view showing the post-filter section removed from the membrane section of the cartridge assembly.
Figure 4:
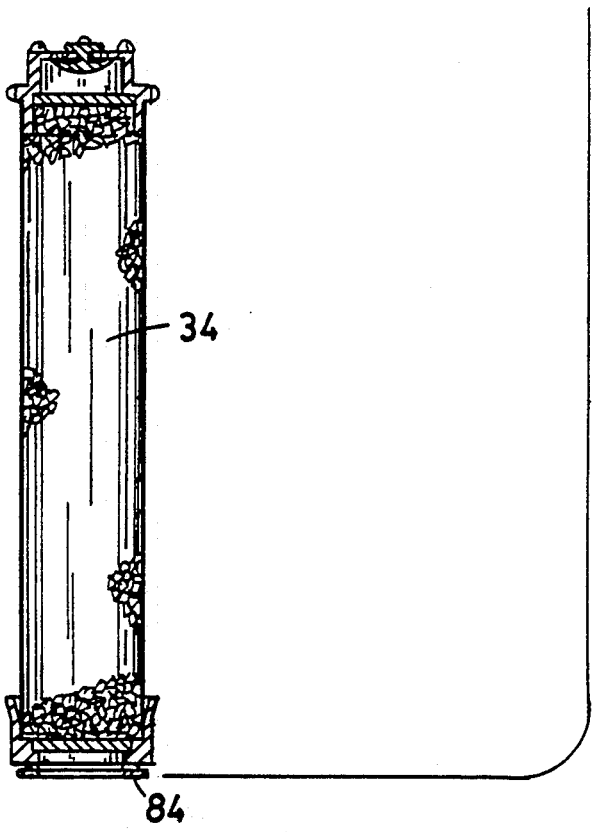

FIG. 4 illustrates the subsequent removal of the post-filter 34 from the pre-filter 32. This may be accomplished readily by pulling the ring 84 while holding the membrane filter 32 by its support ring 38.

It will be apparent from the foregoing description that the mechanism provides a reverse osmosis filter cartridge assembly wherein the pre-filter is maintained as an integral body and may readily be removed or replaced from the rest of the assembly, thus providing for the removal and replacement independently of each of the filter sections of the assembly. The plastic barrier wrapping 100 around the membrane filter section 32 has a lower coefficient of friction with the material of the pre-filter section even when that material is wet, than the pre-filter material would have with the media of the membrane section 32, thereby further facilitating the sliding movement of the pre-filter section with respect to the membrane section and facilitating the removal and replacement thereof.

Variations and modifications of the herein described reverse osmosis filter cartridge assembly and the mechanism for enabling the pre-filter thereof to be a separately removable and replacable section of the assembly, within the scope of the invention, will undoubtedly suggest themselves to those skilled in the art. Accordingly the foregoing description should be taken as illustrative and not in a limiting sense.

We claim:

1. In a reverse osmosis filter cartridge assembly adapted to be contained in a tubular housing, said cartridge assembly having an annualar reverse osmosis membrane section, a cylindrical post-filter section, and an annular pre-filter section which sections are disposed in coaxial relationship in said housing, a mechanism for permitting said sections to be separable from said housing as a unitary structure and for permitting said pre-filter and post-filter and membrane sections to be separated independently from each other, said mechanism comprising a support ring having a central opening, said reverse osmosis membrane section having a membrane body, said body having an annular outer peripheral surface, means for providing a unitary membrane structure including said support ring attached to said membrane body, said post-filter section being received in said opening and within said membrane body, and said pre-filter section defining a sheath movably disposed around said outer peripheral surface of said membrane body in juxtaposition and in contact therewith.

2. The mechanism according to claim 1 wherein said cartridge assembly has opposite ends, said sections and membrane body have opposite ends, said support ring defining one of the opposite ends of said cartridge assembly, said ring having opposite sides facing inwardly and outwardly of said cartridge assembly, said inwardly facing side of said ring being disposed against one of the opposite ends of said membrane body, said support ring having a flange disposed around said outer periphery of said membrane body and having an edge spaced from said inwardly facing side thereof, first and second rings dispose at and defining opposite ends of said pre-filter section, said first ring having an inner periphery with a step facing outwardly into which said flange is received, said first ring being disposed facing said one of said opposite ends of said cartridge assembly, said second ring facing the other of said opposite ends of said cartridge assembly.

3. The mechanism according to claim 2 wherein said first ring carries an annular seal bearing against said flange of said support ring, and said second ring carries an annular seal bearing against said tubular housing when said cartridge assembly is received therein.

4. The mechanism according to claim 1 wherein said sections are also in concentric relationship, said support ring is disposed at one end of said assembly and said sections extend between said one end and the end of said assembly opposite to said one end, said pre-filter section being slidably disposed around said membrane section, a layer of material having a lower coefficient of friction with said pre-filter section when wet than the coefficient of friction between media providing said pre-filter section and media providing said membrane section said layer being disposed around the outer periphery of said membrane body to permit said pre-filter section readily to be removed from its location as said sheath on said membrane section and to be replaced thereon.

5. The mechanism according to claim 1 wherein said sections are coaxially and concentrically disposed in said assembly, said pre-filter section comprising a tubular body having a plurality of layers of filter media extending longitudinally in the direction of the axis of said assembly, first and second rings respectively disposed at one end of said body to provide a first end of said pre-filter section and at a second end of said body to provide a second end of said pre-filter section opposite to said first end thereof, said first ring having inner and outer rims extending respectively around the inner and outer peripheries thereof, said second ring having at least one rim which extends around its outer periphery, said layers of said pre-filter body being disposed between the rims of said first ring, said rim of said second ring extending along said layers toward said first ring.

6. The mechanism according to claim 5 wherein said first and second rings each have a plurality of passages therethrough providing communication for water into said pre-filter section through said first ring and out of said pre-filter section through said second ring, said support ring having a rim facing and spaced from said first ring, said rim having a flange disposed along the outer periphery of said membrane section, said flange and the inner periphery of said first ring being disposed in sealing relationship for the flow of water therebetween when said pre-filter section is assembled with said membrane section to provide said cartridge.

7. The mechanism according to claim 6 wherein said housing has an end plate closing one end thereof, said end plate having an opening for feed water into said pre-filter section, wastewater from said membrane section and product water from said post-filter section, said support ring having a plurality of concentric peripheral surfaces disposed in sealing relationship with said end plate to define an annular feed water chamber with said pre-filter section and an annular waste water out feed chamber with said membrane section, said support ring having a plurality of passages extending between said membrane section and said end plate in said water out feed chamber, and a product water out feed chamber in which said central opening of said support ring is disposed providing communication with said opening for product water from said post-filter section.

8. The mechanism according to claim 7 further comprising a membrane mounting tube, said membrane section having an inner periphery defined by said tube, said tube extending from said support ring to the other of the opposite ends of said cartridge assembly, a cap on said tube defining with said tube a cylindrical chamber containing said post-filter section, said post-filter section being movably disposed in said tube between said opposite ends of said cartridge assembly.

9. The mechanism according to claim 8 wherein said mounting tube is supported at one end by said end cap and at the other end by said support ring, said mounting tube including a plurality of radially disposed flow apertures in a cylindrical wall thereof, said pre-filter section including alternating layers of filter media and open weave spacer sheet, an impermeable barrier layer around the outer periphery of said membrane section separating said membrane section from said pre-filter section sheath when said pre-filter section is assembled therewith to provide said cartridge assembly, a second impermeable barrier layer round about the layers of said filter media to define the outer periphery of said pre-filter section, said post-filter section comprising a carrier tube mounted within said mounting tube, and filter granules within said carrier tube through which said product water passes to said product water out feed chamber.

10. The mechanism according to claim 8 further comprising a removable end cap on the end of said tubular housing opposite to the end having said end plate thereon, said end cap being spaced from said cartridge assembly to provide a passage for water radially inward of said tubular housing between the ends of said pre-filter and membrane sections at the end of said cartridge assembly opposite the end thereof which is provided by said support ring.

* * * * *